United States Patent [19]

Hagarty

[11] Patent Number: 4,889,203

[45] Date of Patent: Dec. 26, 1989

[54] COMPOSITE ENGINE ENCLOSURE

[75] Inventor: Jon R. Hagarty, Darien, Ill.

[73] Assignee: J. I. Case Company, Racine, Wis.

[21] Appl. No.: 231,357

[22] Filed: Aug. 12, 1988

[51] Int. Cl.$^4$ ............................................. B62D 25/10
[52] U.S. Cl. ................................ 180/69.24; 180/69.21
[58] Field of Search ............... 180/69.21, 69.22, 69.23, 180/69.24; 16/DIG. 13

[56] References Cited

U.S. PATENT DOCUMENTS

| | | | |
|---|---|---|---|
| 1,446,814 | 2/1923 | Scott | 280/69.24 |
| 2,393,647 | 1/1946 | Marple | 292/214 |
| 2,833,365 | 5/1958 | Kesl et al. | 280/69.24 |
| 2,960,254 | 11/1960 | Kiba | 16/DIG. 3 |
| 3,174,575 | 3/1965 | May et al. | 280/69.21 |
| 3,743,045 | 7/1973 | Hansen | 280/69.24 |
| 3,815,701 | 6/1974 | Mayhew | 180/69.21 |
| 3,863,729 | 2/1975 | Von Fummetti et al. | 280/69.24 |
| 3,918,540 | 11/1975 | Haupt | 280/69.23 |
| 3,933,216 | 1/1976 | Irwin | 180/69.21 |
| 4,037,682 | 7/1977 | Sandrock | 180/69.2 |
| 4,131,172 | 12/1978 | Wolfgram | 280/69.24 |
| 4,190,929 | 3/1980 | Palka | 16/DIG. 13 |
| 4,415,052 | 11/1983 | Ganer | 280/69.24 |
| 4,454,926 | 6/1984 | Akins | 180/69.24 |
| 4,611,680 | 9/1986 | Redenbarger | 180/69.24 |
| 4,669,563 | 6/1987 | Kerney | 180/69.24 |

FOREIGN PATENT DOCUMENTS 1451442 10/1976 United Kingdom ......... 16/DIG. 13

OTHER PUBLICATIONS

*International 5008, 5288 and 5488 Tractors,* Operator's Manual, p. 30, 1981.
*Allis-Chalmers 5020/5030,* advertising brochure, 2 pages, 1982.

Primary Examiner—David M. Mitchell
Attorney, Agent, or Firm—Dressler, Goldsmith, Shore, Sutker & Milnamow, Ltd.

[57] ABSTRACT

A composite engine enclosure for a tractor or like power-driven implement is disclosed. The enclosure includes a pivotal upper hood which is movable between raised and lowered positions, and at least one associated lower hood panel which cooperates with the other hood for substantially enclosing the engine of the implement. Each of the lower hood panels is provided with a hinging and latching arrangement to permit either pivotal opening movement of each panel, or complete removal of the panel from the implement, as may be required.

3 Claims, 3 Drawing Sheets

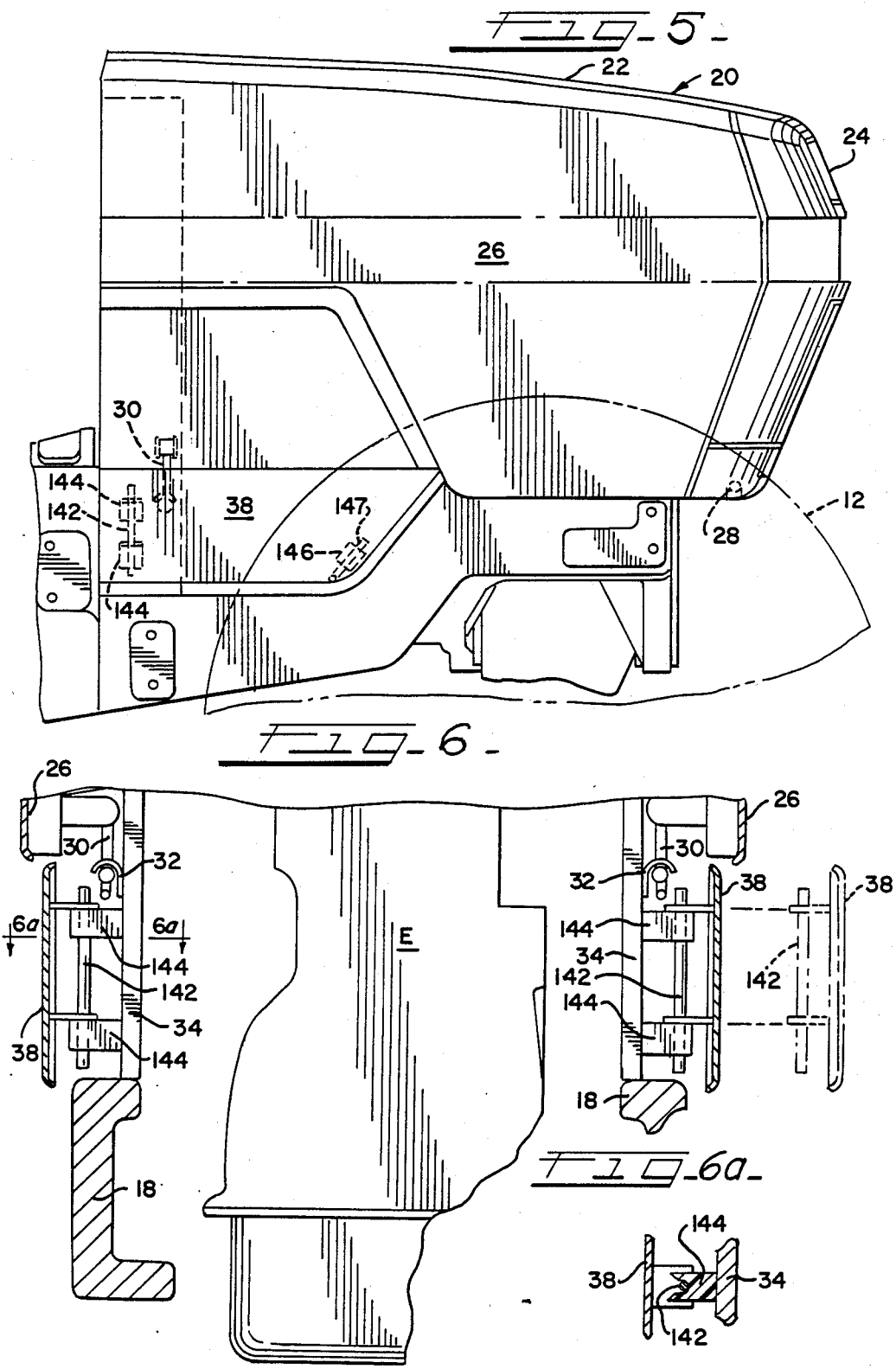

COMPOSITE ENGINE ENCLOSURE

TECHNICAL FIELD

The present invention relates generally to engine hood assemblies for tractors and like implements, and more particularly to a composite engine enclosure including a pivotal upper hood, and at least one selectively movable lower panel to facilitate access to the implement engine for maintenance and service.

BACKGROUND OF THE INVENTION

Power-driven implements such as tractors are widely-used for all manner of agricultural and material-handling operations. In a typical configuration, such an implement includes a wheeled chassis having an engine mounted thereon, typically at the forward portion of the chassis.

While early tractor designs have ordinarily included engines which were relatively open with minimal enclosing structures, modern tractors typically include some form of engine enclosure, thereby shielding engine components from dirt and debris, suppressing engine noise, and enhancing the appearance of the implement.

While some form of engine enclosure is desirable, it is preferred that the enclosure structure not detract from efficient operation and maintenance of the implement. For example, proper engine maintenance dictates that certain servicing be performed on a daily basis, such as inspection of coolant and oil levels. As will be appreciated, if the engine is to be substantially completely enclosed, such daily maintenance requires that the hood or other enclosure for the engine be sufficiently opened as to permit the required servicing.

However, typical hood configurations have not always facilitated this type of routine maintenance. For example, some previous hood structures have been configured for generally forwardly opening movement, thus providing an engine access, but have required relatively complex hinge linkage arrangements to move the hood to an out-of-the-way disposition. Additionally, auxiliary equipment used with the implement, such as a front-mounted fertilizer tank, counterweight, loader bucket, or the like, may interfere with such hood movement, thereby undesirably detracting from convenient performance of routine servicing.

It is therefore desirable to provide an engine enclosure for a tractor or like implement which substantially completely encloses the engine, while still facilitating convenient access to those components of the engine required for necessary routine service.

SUMMARY OF THE INVENTION

The present invention comprises a composite engine enclosure for a tractor or like power-driven implement which is configured so as to substantially completely enclose the engine, while still facilitating convenient access to those components of the engine which require routine and regular inspection and maintenance. Generally, the composite assembly includes a pivotal upper hood, which normally is maintained in a lowered, closed position, with the assembly further including one or more lower hood panels which can be selectively opened for access to those engine components requiring relatively frequent inspection and maintenance.

In the illustrated embodiment, the present engine enclosure comprises a support frame, which may comprise portions of the implement frame, or appropriate support frame structures mounted thereon. The enclosure further includes a box-like upper hood including a top portion, a front portion depending therefrom, and a pair of opposed side portions depending from respective opposite sides of the top portion. The upper hood is mounted by a hood hinge to the support frame generally at the lower edge of the front portion of the hood. By this arrangement, the upper hood is mounted for generally vertical pivotal movement about a horizontal axis defined by the hood hinge between a raised, opened position, and a lowered, closed position. Hood latching means are provided for releasably securing the hood in its lowered position during tractor operation.

The present composite enclosure further includes at least one lower hood panel which is located generally below the pivotal upper hood. In the illustrated embodiment, a pair of lower hood panels are provided on respective opposite sides of the tractor, with each lower hood panel mounted on the tractor support frame with a panel hinge for pivotal movement between closed and open positions. In the preferred embodiment, each panel hinge is configured to not only provide the desired hinging movement of its respective panel, but further facilitates removal of the panel, as may be desired for enhanced access to the engine or for some work operations.

Each lower hood panel is provided with a panel latching arrangement for releasably securing the panel in the closed position thereof. In the preferred embodiment, the lower hood panels are positioned relative to the pivotal upper hood such that the upper hood latching mechanism is shielded by the lower hood panels, thus protecting the upper hood latching arrangement from inadvertent release and dirt and debris, while at the same time providing the implement with clean, uncluttered lines.

Other features and advantages of the present invention will become readily apparent from the following detailed description, the accompanying drawings, and the appended claims.

BRIEF DESCRIPTION OF THE DRAWINGS

FIG. 5 is a fragmentary, side elevational view similar to FIG. 2 further illustrating the alternate embodiment of the present invention;

FIG. 6 is a cross-sectional view similar to FIG. 3 further illustrating the alternate embodiment of the present invention; and ( FIG. 6a is a fragmentary cross-sectional view taken generally along lines a—a of FIG. 6.

DETAILED DESCRIPTION

Figure 1:
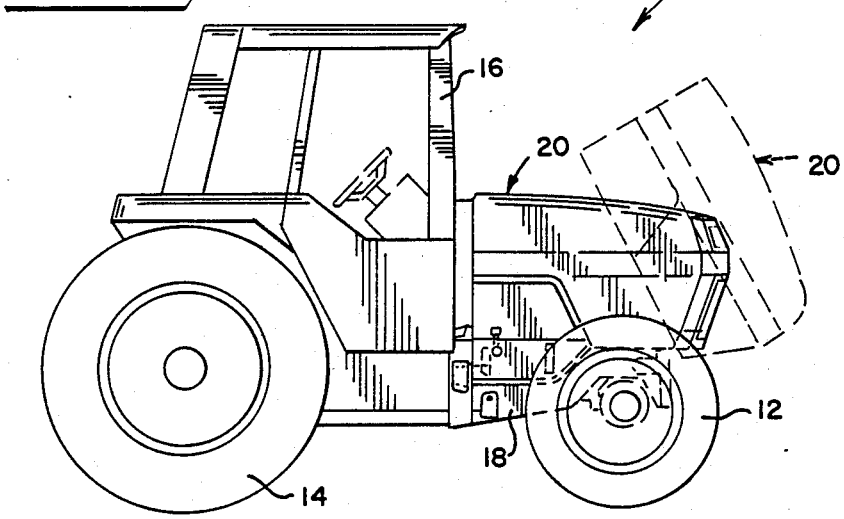
FIG. 1 is a side elevational view of a power-driven implement, illustrated as a tractor, including a composite engine enclosure embodying the principles of the present invention.

While the present invention is susceptible of embodiment in various forms, there is shown in the drawings and will hereinafter be described alternate embodiments of the invention, with the understanding that the present disclosure is to be considered as an exemplification of the invention, and is not intended to limit the invention to the specific embodiments illustrated.

Referring first to FIG. 1, therein is illustrated a power-driven implement, shown as a tractor 10, including a composite engine enclosure embodying the principles of the present invention. Tractor 10 is intended as exemplary of the type of implement for which the present invention is suited, and is shown as including steerable front wheels 12, and driven rear wheels 14. The tractor includes an operator's cab area 16, with the tractor chassis including a support frame 18, upon which the present engine enclosure assembly is generally mounted.

In accordance with the present invention, the composite engine enclosure includes a generally box-like upper hood 20 which is pivotally mounted on the support frame 18 of the tractor 10. The upper hood 20 includes a top portion 22, a front portion 24 depending from the top portion, and a pair of opposed side portions 26 depending from respective opposite sides of the top portion 22. An upper hood hinge 28 (FIG. 2) is provided generally at the lower edge of the front portion 24 of the upper hood, with the hinge 28 permitting generally vertical and forward movement of the hood about a horizontal axis (defined by the hinge 28) from a closed, lowered position to an opened, raised position (shown in phantom line in FIG. 1).

Figure 2:
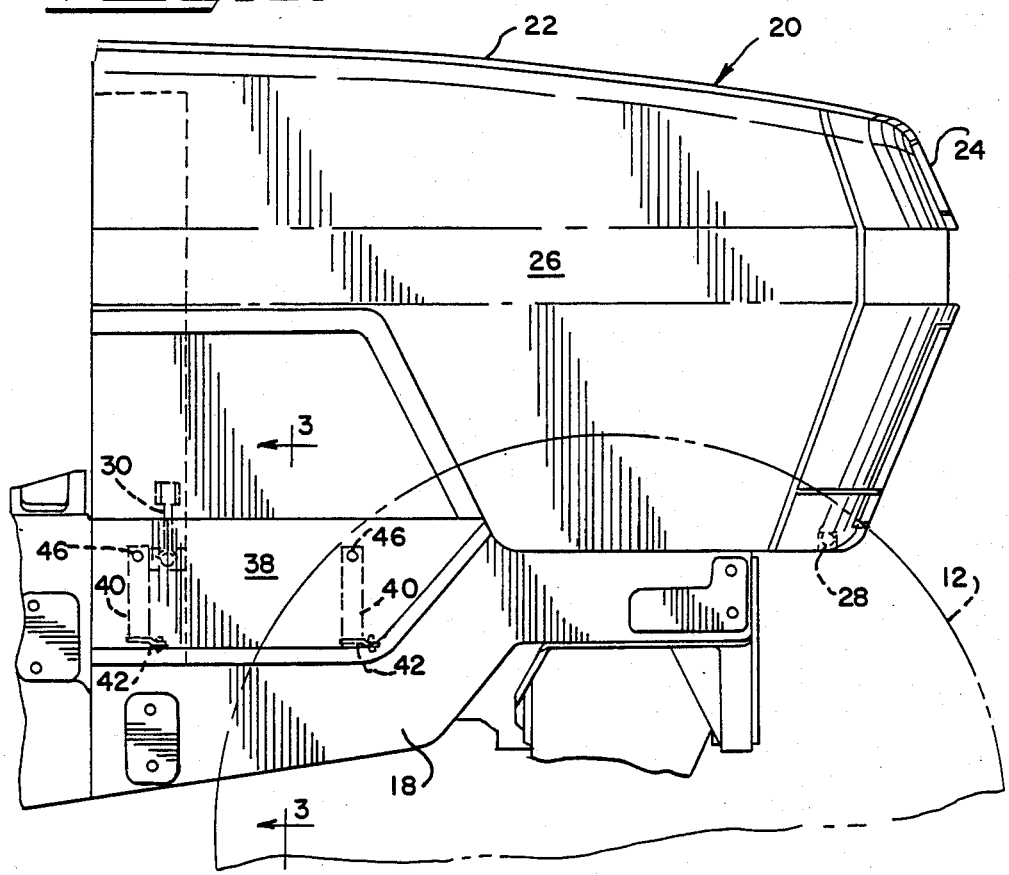
FIG. 2 is a fragmentary, relatively enlarged side elevational view of the present composite engine enclosure.
Figure 3:
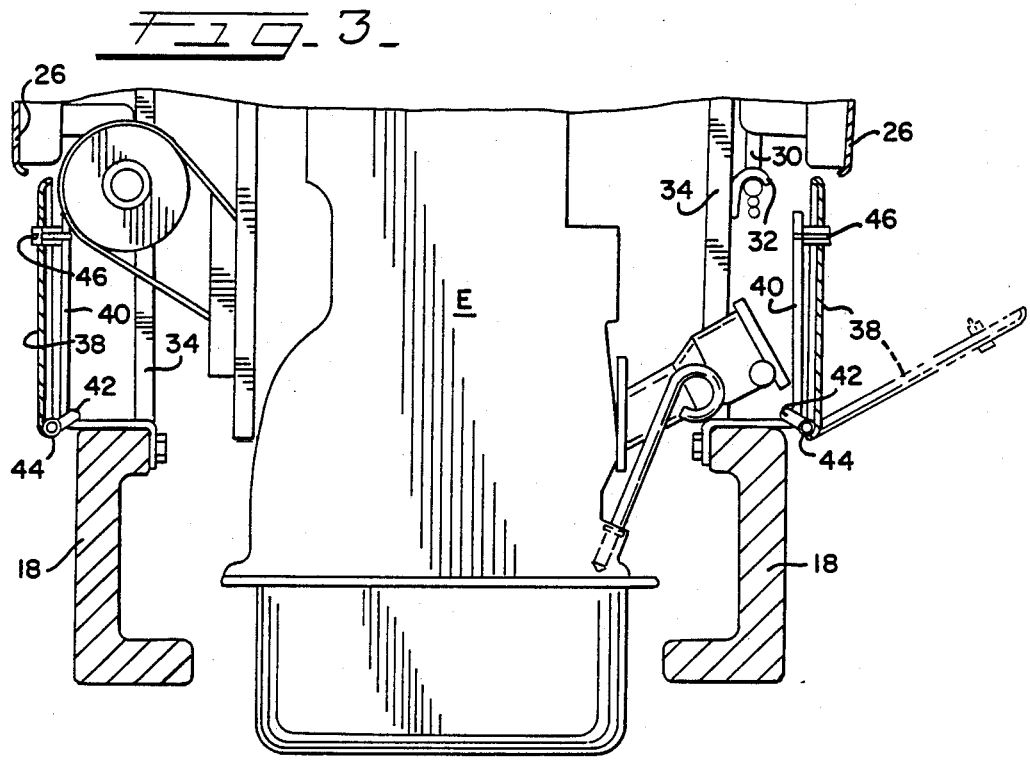
FIG. 3 is a cross-sectional view taken generally along lines 3—3 of FIG. 2.

In the preferred form, a latch arrangement is provided for securing the upper hood 20 in its closed, lowered position. As best shown in FIGS. 2 and 3, an upper hood latch 30 is mounted on the inside of each of the side portions 26 of the upper hood 20. While the upper hood latching arrangement may be provided in any of a wide variety of forms, the illustrated hood latches 30 are generally in the nature of selectively extendable latch elements (such as comprising elastomeric material), with a ball-like element near the lower end of each latch 30 configured for latching cooperation with a respective fork-like latch catch 32, each mounted on a support frame bracket 34 extending upwardly from the support frame 18. Thus, each upper hood latch 30 can be readily engaged and disengaged with this respective latch catch 32 by manually biasing the hood latch downwardly.

In accordance with the present invention, the composite engine enclosure further includes at least one, and preferably a pair, of lower hood panels 38 which are positioned generally below the upper hood 20 on respective opposite sides of the tractor 10. Depending upon the specific requirements of the implement, it can be desirable to form the lower panels 38 to be substantially solid and imperforate, or alternately the lower panels may be of a screen-like, perforate construction. As shown, lower panels 38 generally complement and cooperate with the upper hood 20 in its lowered position for enclosing the associated engine E of the tractor 10. Additionally, lower hood panels 38 are preferably positioned and dimensioned relative to the upper hood latches 30 so as to shield and cover the upper hood latches when the upper hood 20 is in its lowered position and the lower hood panels are closed.

In the preferred form, each lower hood panel 38 is mounted for pivotal movement relative to the tractor between closed and opened positions. To this end, hinge means are provided for each lower hood panel 38, which notably, are configured to permit complete removal of one or both of the lower panels 38. Removal of the lower panels can be desirable in some instances, such as to facilitate mounting of a front-end loader on the tractor 10.

In the embodiment of the present invention shown in FIGS. 2 and 3, each lower hood panel 38 is mounted for hinging movement on a respective pair of support frame brackets 40 by means of hinge pins 42 and hinge sleeves 44. The hinge pins 42 are mounted on either the support frame brackets or the hood panel 38, with the hinge sleeves being mounted on the other of the frame brackets and the hood panels. In the illustrated embodiment, the hinge pins 42 are secured to the brackets 40, with the hinge sleeves 44 in turn secured to the lower edge of the respective lower hood panel 38. The hinge sleeves receive a respective one of the hinge pins 42 for relative rotation, thus providing the desired pivotal movement of each lower hood panel 38.

Panel latches 46, such as comprising suitable quick-release, quarter-turn fastening devices, are provided for releasably securing the lower hood panels 38 in the closed position. In the preferred embodiment, the hinge assembly for each lower hood panel is configured so as to permit complete removal of the panel from the tractor. In the illustrated embodiment, this is achieved by providing each of the hinge pins with a generally S-shaped configuration, with the hinge sleeves 44 being received about an offset portion of each hinge pin. Thus, latches 46 can be released, and panels 38 pivoted downwardly for access, or pivoted downwardly and moved forwardly for removal.

Figure 4:
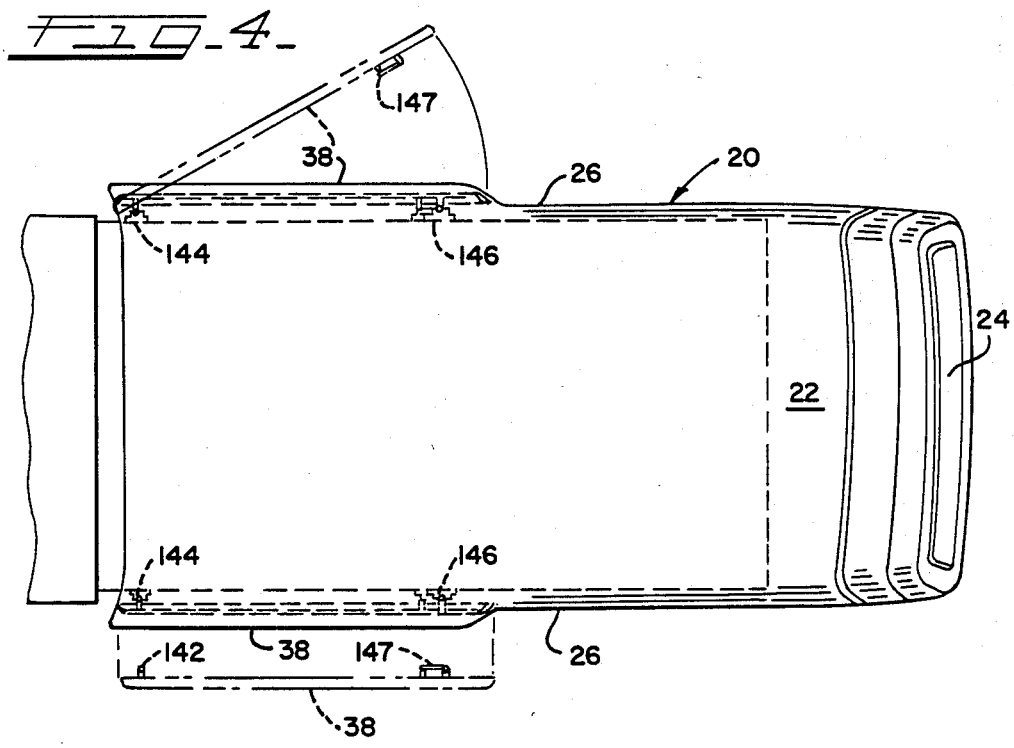
FIG. 4 is a fragmentary, top plan view illustrating an alternate embodiment of the present composite engine assembly.

Referring now to FIGS. 4-6, an alternate hinging and latching arrangement for lower hood panels 38 is illustrated. As in the previous embodiment, this alternate construction permits not only pivotal opening and closing of the lower hood panels, but further permits complete removal of the panels as may be required.

To this end, each lower hood panel 38 is hingedly mounted on a respective one of the associated support frame brackets 34 by elastomeric bushings 144 mounted on either the support frame bracket 34 or the lower hood panel 38, and a cooperating hinge pin 142 mounted on the other of the support frame bracket and hood panel. In the illustrated embodiment, a pair of the elastomeric bushings 144 are provided in vertically spaced relationship on each support frame bracket 34, with each bushing 144 defining an opening for removably receiving the associated hinge pin 142 (see FIG. 6a).

In this embodiment, the lower panel latching arrangement is similar to the construction of the hinge elements, in that an elastomeric latch catch 146, generally of a configuration like elastomeric bushings 144, releasably receives an associated latch pin 147 mounted on a respective one of the lower hood panels 38. By this construction, each of the lower hood panels 38 can be pivotally opened by removing its latch pin 147 from the associated elastomeric latch catch 146, with the respective hinge pin 142 rotating relative to its elastomeric bushings 144. If complete removal of the panel 38 is required, the configuration of the elastomeric bushings 144 permits removal of the hinge pin 142.

From the foregoing, it will be observed that numerous modifications and variations can be effected without departing from the true spirit and scope of the novel concept of the present invention. It is to be understood that no limitation with respect to the specific embodiments disclosed herein is intended or should be inferred. The disclosure is intended to cover by the appended claims all such modifications as fall within the scope of the claims.

What is claimed is:

1. A composite engine enclosure for a power-driven implement, comprising:

support frame means on said implement;

a pivotal upper hood having a top portion, a front portion depending therefrom, and a pair of opposed side portions depending from respective opposite sides of said top portion, said upper hood being mounted by hood hinge means to said support frame at said front portion of said upper hood for generally vertical and forward pivotal movement about a horizontal axis between raised and lowered positions;

upper hood latching means for releasably securing said upper hood in the lowered position of said hood;

at least one lower hood panel located generally below said upper hood and rearwardly of said hood hinge means, and adjacent to a respective one of said pair of opposed side portions of said upper hood when said upper hood is in said lowered position, said lower hood panel being movably mounted on said support frame means with panel hinge means for pivotal movement between closed and open positions, said panel hinge means further permitting removal of said lower hood panel from said support frame means, said lower hood panel being positioned to shield and cover said upper hood latching means when said upper hood is in said lowered position and said lower hood panel is in said closed position by the disposition of said upper hood latching means behind said lower hood panel; and panel latching means for releasably securing said lower hood panel in said closed position thereof.

2. The composite engine enclosure in accordance with claim 1, wherein said panel hinge means comprises at least one hinge pin mounted on one of said support frame means and said lower hood panel, and at least one hinge sleeve mounted on the other of said support frame means and said lower hood panel, said hinge pin being removably received in said hinge sleeve for relative rotation.

3. The composite engine enclosure in accordance with claim 1, wherein said panel hinge means comprises at least one hinge pin mounted on one of said support frame means and said lower hood panel, and at least one elastomeric bushing mounted on the other of said support frame means and said lower hood panel, said hinge pin being removably received in said elastomeric bushing for relative rotation.

* * * * *